July 5, 1955

C. C. GREEN 2,712,203

BATCH PREPARING DEVICE

Filed May 25, 1951

INVENTOR
CLARENCE C. GREEN by
Walter + Kaufman

ATTORNEY

Fig.2

July 5, 1955  C. C. GREEN  2,712,203
BATCH PREPARING DEVICE
Filed May 25, 1951  7 Sheets-Sheet 3

INVENTOR
CLARENCE C. GREEN

ATTORNEY

July 5, 1955　　　　　　C. C. GREEN　　　　　　2,712,203
BATCH PREPARING DEVICE

Filed May 25, 1951　　　　　　　　　　　　　　7 Sheets-Sheet 4

INVENTOR
CLARENCE C. GREEN
by
Walter F. Kaufman
ATTORNEY

INVENTOR
CLARENCE C. GREEN
ATTORNEY

July 5, 1955   C. C. GREEN   2,712,203
BATCH PREPARING DEVICE
Filed May 25, 1951   7 Sheets-Sheet 7

INVENTOR
CLARENCE C. GREEN
by
Walter F. Kaufman
ATTORNEY

United States Patent Office 2,712,203
Patented July 5, 1955

2,712,203

BATCH PREPARING DEVICE

Clarence C. Green, Manheim Township, Lancaster County, Pa., assignor to Armstrong Cork Company, Lancaster, Pa., a corporation of Pennsylvania Application May 25, 1951, Serial No. 228,324

4 Claims. (Cl. 49—63)

This invention relates to a batch preparing device, and more particularly to a device for weighing and mixing in batch lots the raw materials used in the manufacture of glassware or the like.

In the preparation of batches comprising dry materials, it is necessary to accurately control the amounts of the various ingredients to insure that each batch has exactly the same proportion of ingredients as preceding batches in order that the resultant products will be uniform in composition. This is particularly true in the manufacture of glassware and similar articles where it is highly desirable that all the glassware be of substantially the same quality, regardless of the quantity manufactured. In the manufacture of this type of material, it is not possible to mix a batch of raw materials large enough to produce all the glassware of a given type required for one order. It is, therefore, necessary in most instances that several batches be made in order to produce the required quantity of glassware of a given type. If the batch preparation is accurately controlled, it is possible to prepare a series of glass batches which are uniform in the proportion of ingredients and the glassware produced therefrom is of a uniform quality, thereby greatly diminishing the amount of material which must be rejected due to poor quality resulting from improper batch preparation.

Another requirement in the preparation and handling of batches of dry raw material is to limit handling of the material after the batch has been mixed. If the material is handled to any great extent after mixing, a certain amount of segregation results and the batches are no longer homogeneous mixtures.

The term "homogeneous mixture" used throughout this specification refers to a mixture of dry ingredients in which the particles of each ingredient are uniformly distributed throughout the entire mass, so that samples taken from various parts of the mass will all contain the same proportioning of ingredients.

In the prior art methods of preparing batches of this type, the raw materials were carted to a large mixer and mixed, after which they were dumped into suitable carriages and moved about from place to place, stored in stroage bins until the time that they were to be used, and then transported to the furnaces. This excessive handling of the material after mixing resulted in a great deal of segregation of the raw materials, causing a high percentage of defective glassware. Also, the weighing and measuring of the various ingredients entering into the batch were done in a more or less haphazard manner and accurate preparation of batches was difficult to attain.

In order to overcome the disadvantages of the prior art method and in order to utilize the advantages set forth above, I have developed a batching device which is substantially automatic, thereby practically removing the possibility of human error which is so often prevalent in the preparation of batches of this type. I have also perfected a device wherein the final mixing of the ingredients takes place immediately prior to storage and subsequent usage of the material, thereby placing at a minimum the amount of handling which takes place after the batch has been mixed.

With a system such as that set forth herein, it is possible to cover the various elements in the processing line with hoods and dust guards to prevent the health and accident hazards which are usually encountered in places where large quantities of dry pulverized materials are being handled and mixed.

It is an object of this invention to provide a system for producing batches of dry materials so that one batch will have substantially the same proportioning of dry ingredients as the preceding and succeeding batches.

Another object of this invention is to provide a system in which more than one batch of materials is in process at one time, thereby greatly increasing the speed with which the raw materials are prepared for subsequent manufacturing processes.

A further object of this invention is to provide a system for preparing batches of dry ingredients in which the resultant product will be more uniform in quality, thereby greatly diminishing the amount of imperfect material caused by improper proportioning of raw materials.

A still further object of this invention is to provide a device in which there is little likelihood of segregation occurring between the time the batch is mixed and the time it is used in the furnace.

In order that my invention may be more readily understood, it will be described in connection with the attached drawings in which Figures 1 and 2 taken together show a diagrammatic set-up of the entire batch weighing, mixing, and storing equipment.

Figure 1:
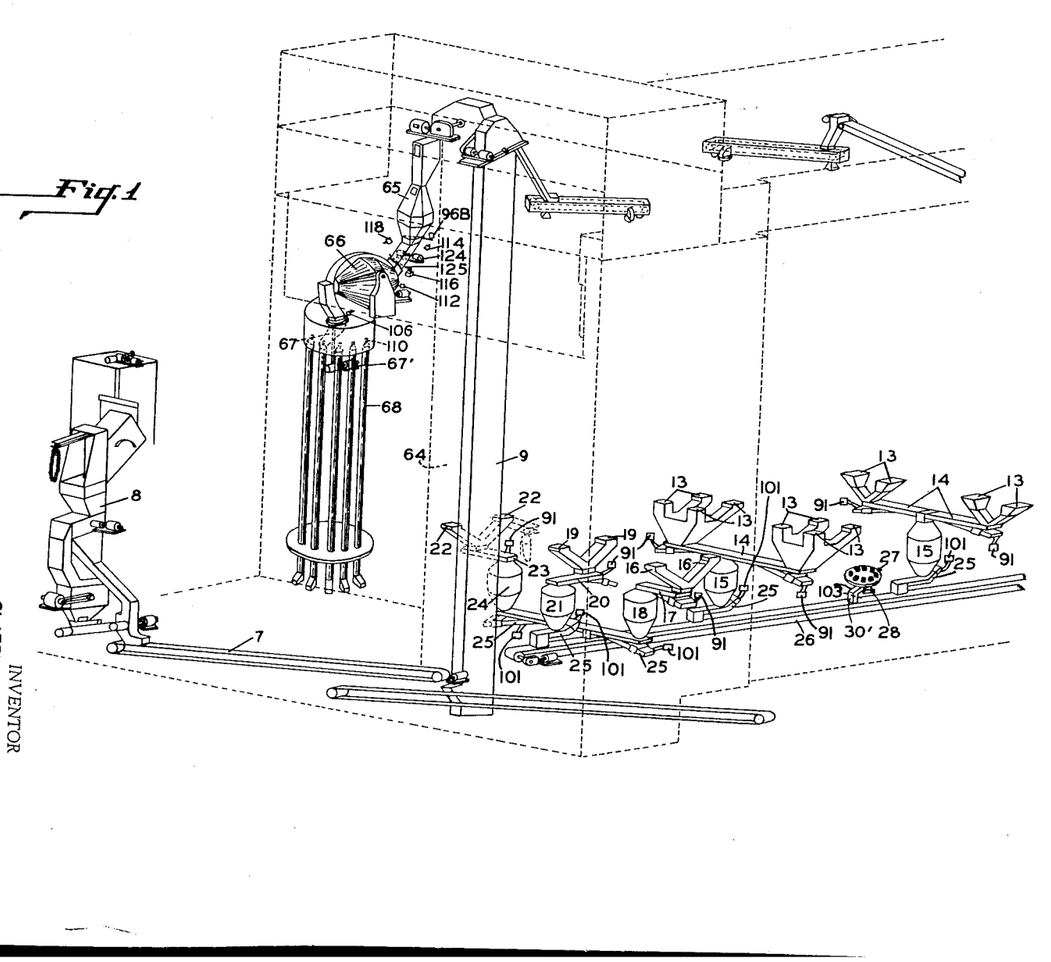
Figure 2:
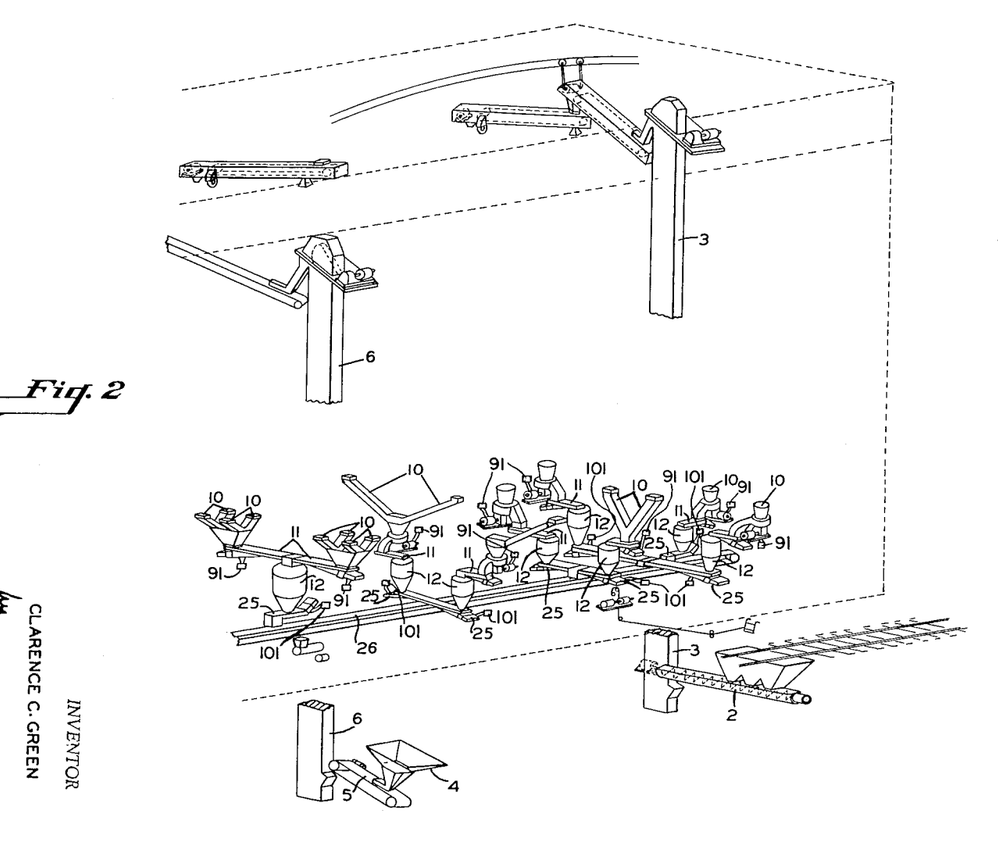

Referring to Figures 1 and 2, there is shown a diagrammatic layout for the batching equipment used in carrying out my invention. The raw materials used in the manufacture of glass are basically the same, regardless of the type of glassware being produced. The color is determined by the addition of a minor amount of material to the main batch. The basic ingredients comprise sand, cullet (reprocessed glass), and a certain amount of so-called main ingredients, comprising, for example, soda ash, burnt lime, barytes, apelite, limestone, mepheline syenite, and razorite. The above are listed as typical main ingredients; however, other ingredients may be added or substituted. These main ingredients are received in bulk quantities and are conveyed by suitable conveyors and elevators to storage bins located in the top of the building. In Figures 1 and 2, the numeral 2 designates the screw conveyor which conveys the chemical ingredients from the truck or railroad car to the elevator 3. This elevator 3 takes the material up to the storage bin located in the upper portion of the building. The sand is dumped into a hopper 4, from which it passes over a belt conveyor 5 to an elevator 6, which takes it to the top part of the building for storage. The cullet is first screened and the material which passes through the screen is deposited on a conveyor 7. The particles of cullet which are too big to pass through the screen are fed into a crusher 8, which reduces the particle size so that it will pass through the screen. After screening, this material is also fed onto the conveyor belt 7, which takes it to the elevator 9, which stores it in suitable bins in the top of the building.

There are three major colors of glassware manufactured at the present time. These colors are flint, amber, and emerald green. It is, therefore, desirable to have on hand three different colors of cullet to be used for the different types of glassware being manufactured.

Attached to the bottom of the storage bins for the main ingredients are suitable chutes which are connected to vibrating conveyors, which convey the material to weigh hoppers. These chutes are designated by the numeral 10 in Figure 2. The material is fed by gravity through these chutes on to the vibrating conveyors 11, and the vibrating conveyors feed the material into the weigh hoppers 12. These numbers above are used to designate the chute, conveyor, and weigh hoppers for the main ingredients, such as soda ash, burnt lime, limestone, etc. In Figure 1 are shown the chutes 13, which are located underneath the sand storage bins, for conveying sand to the vibrating conveyors 14, to be fed to the weigh hoppers 15. The numeral 16 designates the chute from the flint cullet storage bin which directs a flint cullet to the vibrating conveyor 17, which feeds it to the weigh hopper 18. The numeral 19 designates the chute leading from the amber cullet storage bin for transferring the amber cullet to the vibrating conveyor 20 to weigh hopper 21. The numeral 22 designates the chutes for transferring raw materials from the emerald green cullet bin to the vibrating conveyor 23, which supplies the weigh hopper 24.

Figure 11:
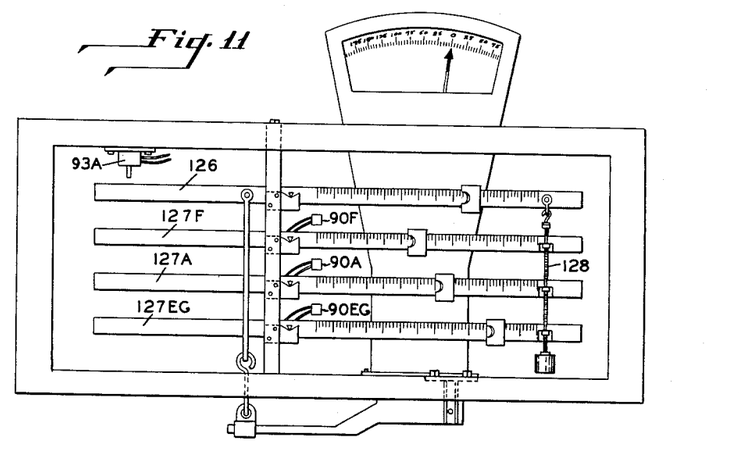
Figure 11 is a detailed view of the beam arrangement of the scales.
Figure 12:
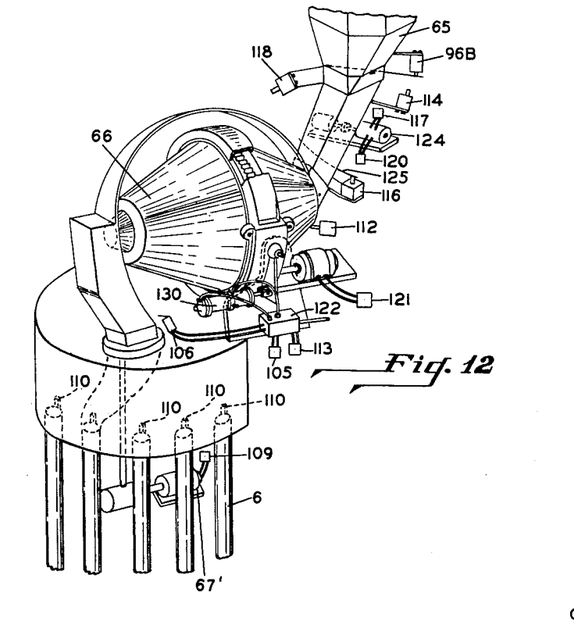
Figure 12 is a detailed view of the surge bin and mixer showing the controls and mixer tilting mechanism.

The weigh hoppers 12 for the main ingredients, the weigh hoppers 15 for the sand, and the weigh hoppers 18, 21, and 24 for the cullet, are positioned on suitable scales. Each scale is provided with four beams. The one beam 126 (Figure 11) is used to balance the scale and the other three beams 127-F, 127-A, and 127-EG are used to set off the required amount of the particular ingredient fed to the weigh hoppers required in the particular formulation being produced on the equipment. For example, each scale is provided with a beam for flint formulation, a beam for amber formulation, and a beam for emerald green formulation. Each of these beams is manually set before the equipment is put in operation. The scale beam arrangement illustrated in Figure 11 is of conventional design. The beams are all connected to the balancing beam 126 by the linkage 128 in such manner that if either of the selector switches are closed to bring either beam 127-F, 127-A, or 127-EG into operation, the right end of the beam will drop when the required amount of material has been placed in the weigh hopper, pulling with it beam 126 until the left end of beam 126 contacts the switch 93. The setting is made from a master formulation sheet, and after the scale is balanced by the poise on the balance beam, the poise on the beam for the specific formulation being produced is set to the proper graduation. In the specific embodiment shown, there are thirteen scales, each provided with four beams. Beneath each weigh hopper is a vibrating conveyor 25, which receives the material from the weigh hopper and deposits it on a conveyor belt 26. This conveyor belt passes through under all the vibrating conveyors 25 and receives all the materials from the weigh hoppers for a specific formulation.

Positioned over the conveyor belt 26 is an intermittently rotatable turntable 27. The turntable and its accompanying mechanism are shown in detail in Figures 3, 4, 5, 6, 7, 8, and 9. A separate motor 28 is provided to drive the turntable intermittently. Around the periphery of the turntable 27 is a plurality of openings 29 (Figure 3) into which tiltable receptacles or buckets 30 (Figure 5) are placed. These buckets contain the coloring or distinguishing ingredients for the glass batches. These ingredients are of a minor amount so far as the total batch is concerned and are weighed on a small scale and placed in the buckets 30. One bucket supplies the distinguishing ingredients for one complete batch, and these ingredients are supplied directly from the bucket through a suitable chute 30' to the conveyor 26 at the same time that the other ingredients are being discharged from the weigh hoppers onto the conveyor belt passing immediately beneath the turntable chute 30'. In the specific embodiment shown, the turntable contains sufficient buckets 30 for fifteen consecutive batches.

During its intermittent circular path of travel, each of the buckets on the turntable passes through four stations at which certain limit switches are located for controlling the operation of the entire batch selecting, weighing, conveying, mixing, and storing equipment. These limit switches are operated by cams located on the bucket support or on the framework of the turntable adjacent the bucket. The four staitons referred to are located approximately twelve degrees apart, and with an arrangement of this type, it will be seen that the entire four stations are taken up by the span of two buckets on the turntable.

For certain operations to be performed during the batching cycle, the same limit switch will be contacted each time a bucket passes a given station. For other operations, different limit switches will be contacted. For example, the scale beam selection and the batch storage tube selection will not be the same for each batch and, therefore, the cams to contact the limit switches for these two operations are manually set for each batch.

Figure 6:
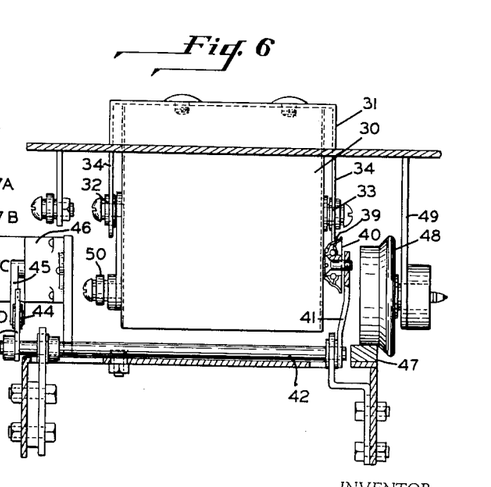
Figure 6 is a front elevational view of the bucket shown in Figure 5.
Figure 7:
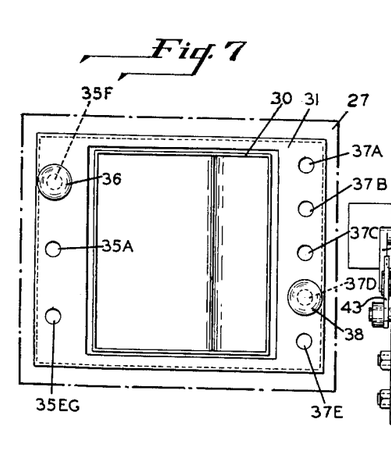
Figure 7 is a top plan view of one of the coloring material containers.

Referring to Figure 7, there is seen a top plan view of the bucket 30 positioned in the turntable 27, and the bucket is supported by a bucket support having a rim or flange 31 which rests on the turntable. The bucket is pivoted about pivot points 32 and 33, which are on hangers 34 extending from the bucket support rim 31. This is illustrated in Figure 6.

On two sides of the rim 31, there are separate series of holes for the manually set cams for operating the limit switches referred to above. The holes 35 on one side of the rim receive the cam button to determine the scale beam to be selected in the series of scales for the particular formulation being prepared. One hole is provided for flint formulation, another for amber, and a third for emerald green. These holes are designated 35-F, 35-A, and 35-EG. In the particular embodiment shown in Figure 7, the cam 36 is placed in the flint position— 35-F. This means that when the bucket here under consideration comes to a certain station, to be described later, the cam 36 will close a limit switch, energizing the flint scale beam 127-F in all the scales to be used for the particular flint formulation being prepared. It will be understood, of course, that the bucket 30 for which the cam is set contains the distinguishing ingredients for flint formulation.

The other side of the rim 31 is provided with five holes 37. The number of holes 37 corresponds with the number of batch storage tubes available for storing the completed batches. The cam 38 is positioned in hole 37-D, and in this position will contact a limit switch which will close the electric circuit for selecting the storage tube. This mechanism will be described later. The two limit switch contacting cams 36 and 38 described above are the two variables which must be manually set for each batch to be prepared. The balance of the limit switches are controlled by cams located on the framework of the turnable and operated by the moving turntable. Inasmuch as these limit switches are always operated when a bucket passes through a given station and the operation is always the same, it is not necessary for any manual setting for different batches.

Figure 3:
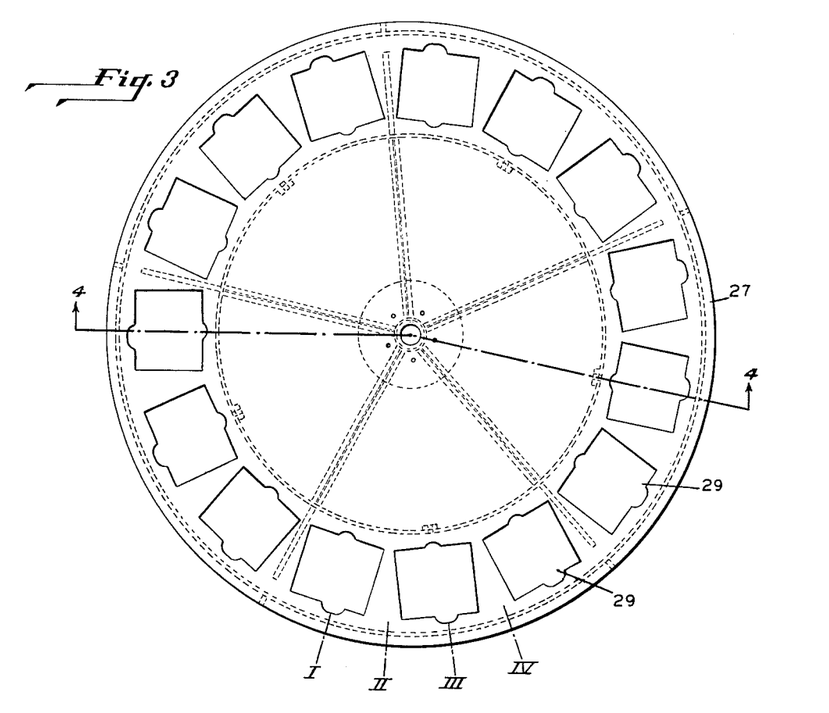
Figure 3 is a top plan view of the color selecting device.
Figure 4:
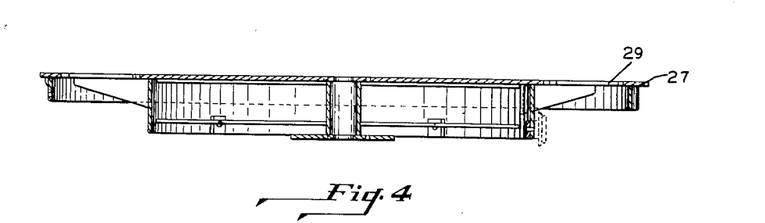
Figure 4 is a cross sectional view taken in the line 4—4 of Figure 3.

Referring to Figure 3, there will be seen the four stations through which the bucket passes while operating the controls here under consideration. When starting the device, a hand jog circuit is provided to move the first bucket into position No. I. At position No. I, the first bucket will strike a switch, de-energizing the hand jog circuit and energizing the automatic motor relay for automatically moving the turntable intermittently through the various stations.

Figure 5:
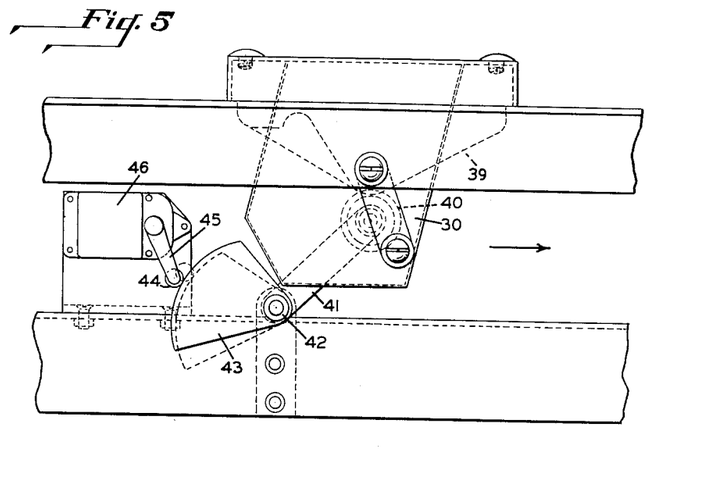
Figure 5 is a side elevation of one of the coloring material containers in its upright position.
Figure 10:
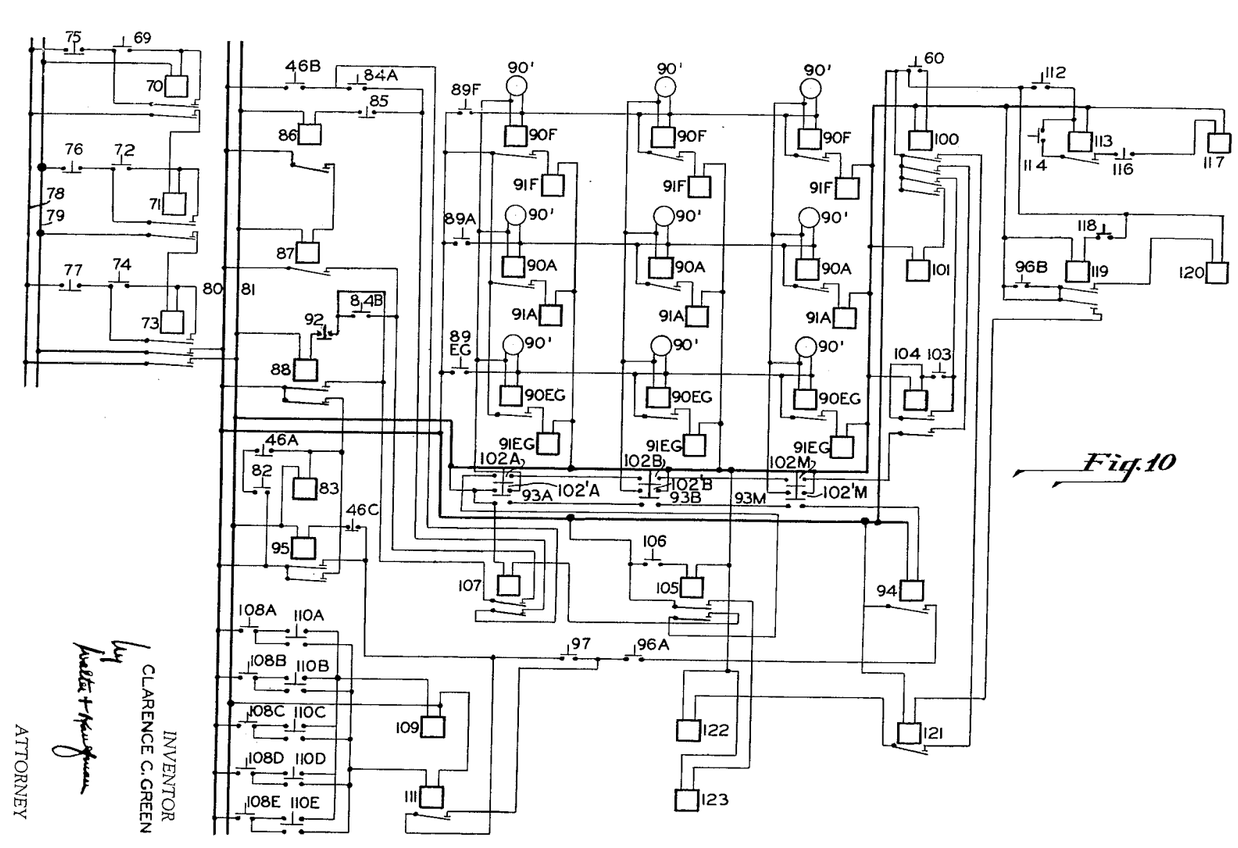
Figure 10 is a diagrammatic view of the wiring circuits for the device.

The particular mechanism for operating this limit switch at position No. I is illustrated in Figures 5 and 6. It will be noted that one of the hangers 34 of the bucket support has a depending cam surface 39 on its bottom edge which is engaged by the cam roller 40. This cam roller 40 is attached to an arm 41, which is keyed to a rocker shaft 42. This rocker shaft passes through under the bucket and carries a cam 43 on its opposite end. Cam 43 engages a roller 44 on an arm 45. In the operation of the device, the bucket moving in the direction of the arrow in Figure 5 will cause the cam roller 40 to roll along the cam surface 39, rotating the arm 41 in a clockwise direction (as viewed in Figure 5) and moving with it the cam 43, since the arm 41 and the cam 43 are keyed to a common shaft 42. This rocking motion of the cam 43 operates the switch 46 through the arm 45. Switch 46 is a multiple contact switch having two normally closed contacts 46-A and 46-C and one normally open contact 46-B, as shown in Figure 10. The cam 43 assumes the position shown in dotted lines in Figure 5 when in its normal position and assumes the position shown in solid lines when operated by the cam roller 40. Also in Figure 6 there is shown a track 47 on which the turntable rotates through the rollers 48, which are rotatably mounted in brackets 49 extending from the web of the turntable 27. The electrical circuits controlled by the switch 46 will be described later.

The switch 46 and the apparatus described above for operating the same are attached to the stationary support for the turntable while the cam surface 39 is on the traveling bucket support and operates the mechanism as the turntable moves the bucket past the station.

At station No. II, the cam 36 will strike a limit switch for selecting the formula to which the distinguishing ingredients in that bucket are to be added.

Figure 8:
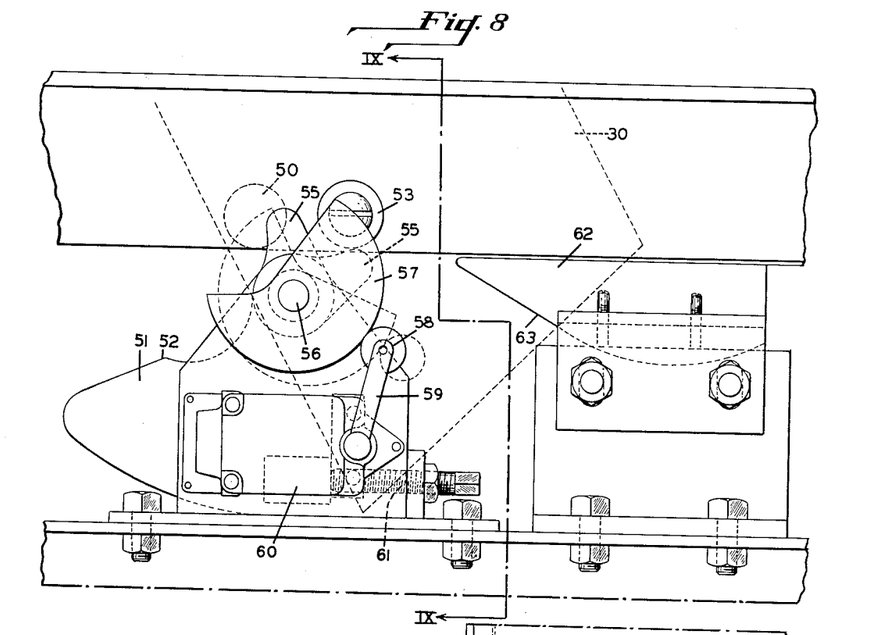
Figure 8 is a side elevational view of the mechanism for tilting the color containers.
Figure 9:
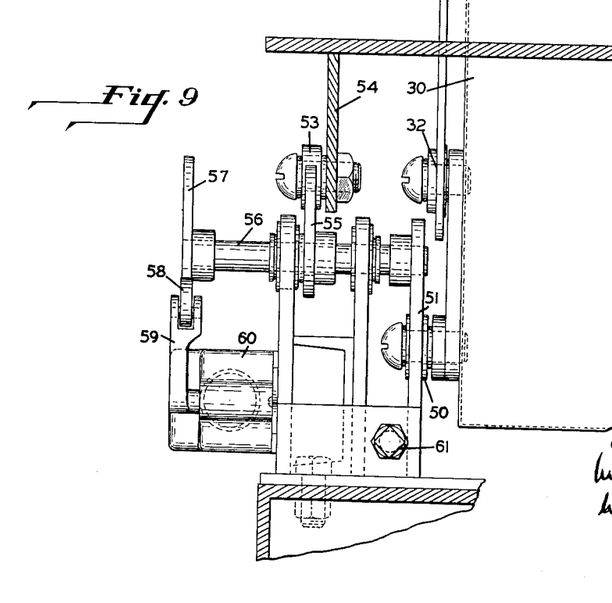
Figure 9 is a front elevational view of the mechanism for tilting the color containers taken in the line IX—IX of Figure 8.

At station No. III, in addition to operating a limit switch, there is also provided a mechanism for dumping the bucket 30. This mechanism is shown in Figures 8 and 9. Figure 8 shows the bucket 30 in its tilted or dump position. This is accomplished by the cam roller 50 mounted on the side of the bucket striking cam 51 mounted on the stationary framework of the turntable. The roller strikes the cam 51 and rolls along the surface 52, and as the roller 50 is raised, the bucket pivots about the pivot points 32 and 33 (Figures 6 and 9). As the cam roller 50 rolls along the cam surface 51, the bucket begins to tilt and the contents of the bucket will shift, helping to swing the bucket around the pivot point. As this shift occurs the roller 50 may be raised above the surface of the cam momentarily. After the contents of the bucket have been dumped, the bucket will tend to right itself due to the fact that its center of gravity is above the pivot points 32 and 33. As the bucket tends to right itself, the roller 50 drops to a position where it will engage a cam 62 which swings the bucket around to its upright position. A second cam roller 53, which is attached to a bracket 54 extending downwardly from the turntable 27, engages a cam 55. This cam 55 is keyed to a shaft 56, which is capable of limited rotation. The forward movement of the cam roller 53 rocks the cam 55 in a clockwise direction (as shown in Figure 8), carrying with it the shaft 56. Keyed to the end of the shaft 56 is a cam 57 which also rocks in a clockwise direction, moving roller 58, which is in engagement therewith, and carrying with it arm 59, which operates the switch 60. In Figure 8, the cams 55 and 57 and the cam roller 58 are shown in solid lines in their normal position, and in dotted lines signifying their position when engaged by the roller 53. It will be noted that an adjusting screw 61 is provided for adjusting the switch with respect to the cam so that minor adjustments may be made to compensate for misalignment caused by constant usage.

In Figure 8 there is also shown a cam 62 for returning the bucket to its original position. The cam roller 50, mounted on the bucket which rides over the cam surface 52, tilting the bucket, also engages cam 62 on the surface 63, and the cam roller is pulled down along the surface 63, swinging the bucket back to its original position for refilling. The electrical circuits operated by the switch 60 will be described later.

As the bucket containing the distinguishing ingredients for the batch being processed moves into position No. III, the other ingredients measured out in the weigh hoppers in accordance with the setting on the scale beams selected by the cam 36 at position No. II are discharged from the weigh hoppers onto the conveyor belt 26, on which they are conveyed to and placed on a bucket elevator 64, which lifts them to the top of the building and deposits the entire batch in a surge bin 65, where the ingredients are held until such time as they are fed into the mixer 66. The mixer 66 mixes the ingredients a predetermined time, after which time the batch is discharged into a chute 67 which has been rotated around to the proper storage tube 68 selected by the cam button 38 at position No. IV. The mixed ingredients are dumped into the storage tube 68, from which they may be withdrawn for subsequent usage. Chute 67 is rotated by means of motor 67'.

The storage tubes 68 are preferably of a relatively small diameter in comparison with their length. In tubes of this type, the mix will keep its homogeneity while being withdrawn from the bottom of the tube. If tubes of a larger diameter are used, there is a tendency for the mix to fall through the center of the tube when the gate at the bottom is open, and the withdrawn portion will not be of a uniform mixture, inasmuch as certain quantities of the batch will adhere along the sides of the storage tube. In the storage tubes of the design here under consideration, the entire column of mix falls when the gate at the bottom is opened. This insures the withdrawal of a homogeneous batch of material, thereby insuring against segregation.

In order to carry out the method described above by automatic means, the electric circuit illustrated in Figure 10 has been developed. In order for the system to function properly, it is necessary that the batch mixer 66, the batch elevator 64, and the batch conveyor 26 be operating at all times.

To start the equipment the start button 69 is manually pressed, which closes the circuit through relay 70, which is the relay for the batch mixer 66. The closing of this relay supplies current from one side of the line to relay 71, which is the relay for the batch elevator 64. The circuit through this relay 71 is completed by manually pressing start button 72, which completes the circuit through relay 71, closing the same and supplying current from one side of the line to batch conveyor relay 73. The circuit to the batch conveyor relay 73 is closed by means of start button 74, which may be manually pressed. All of the relays—70, 71, and 73—are of the interlocking type so that when once energized they remain energized, but the circuit to any one of them may be broken by manually pressing buttons 75, 76, or 77. It will be noted that the electrical circuits to the relays 70, 71, and 73 are such that if the circuit to one is broken, it will automatically stop the preceding equipment in the line to prevent jam-ups in the production line. For example, if the batch mixer is stopped, the batch elevator 64 and batch conveyor belt 26 will automatically stop. If the batch elevator 64 is stopped, the batch mixer 66 will continue to operate, but the batch conveyor 26 will be automatically stopped. If the batch conveyor 26 is stopped, the batch mixer 66 and batch elevator 64 will continue to operate because there is no possibility of jam-ups resulting from their continued operation. Energization of the relay 73 closes the same and supplies current from the main power lines 78 and 79 to the control circuits 80 and 81.

With the power in control circuits 80 and 81, preparation of the batch can be started.

As a preliminary operation to the starting of the batching cycle, the scales are all balanced by means of the scale balance beam 126 and the other beams 127-F, 127-A, and 127-EG of each scale are set for the amount of the ingredient to be supplied in the batch by that particular scale. For example, the flint beam on the sand scale will have its poise set for the quantity of sand required for the specific flint formulation being prepared; the amber beam will have its poise set for the quantity of sand required for the amber formulation being prepared; and the emerald green scale will have its poise set for the quantity of sand required for the emerald green formulation. This procedure is repeated for all of the scales.

After the scales have been set as above described, the selector switches are turned on the control panel for the scales to be used for the flint formulation, the amber formulation, and the emerald green formulation.

It will be understood that not all of the thirteen scales are used on all formulations. If a particular scale is not to be used in the formulation, the selector switch for that particular scale remains in its off position. That means that the particular scale in question will not be drawn into operation during the batching cycle for that specific formulation.

With the selector switches properly set, the batching equipment is started by means of the jog button 82. Manual pressing of this button 82 energizes motor starter solenoid 83, which starts the motor 28 for the turntable 27. The turntable passes through four major positions designated by the numerals I, II, III, and IV on Figure 3. The jog button 82 is held in position until the specific bucket to be used for the start of the operation comes into position No. I. When this bucket reaches position No. I, it will strike switch 46-A, which breaks the electric circuit to the motor starter solenoid 83 and stops the motor 28 for the turntable 27. The mechanical means for operating the switch 46 has been described earlier herein. Also, as the bucket comes into position No. I, switch 46-B is closed. Manually operated switch 84-A is pressed, closing the circuit through button 85 to time delay relay 86. The button 84-A is held until the timer times out and relay 86 closes. The purpose of the time delay in this relay is to allow sufficient time for the control tubes in the equipment to become properly heated before the cycle is started. The closing of relay 86 closes the circuit from the control lines 80 and 81 to relay 87, inasmuch as switch 84-B, which is a part of switch 84-A, is manually closed. The closing of relay 87 closes the circuit to relay 88, the closing of which energizes motor starter solenoid 83, starting motor 28, imparting rotary motion to the turntable 27. This moves bucket No. 1 from position No. I on Figure 3 to position No. II.

Upon reaching position No. II, the manually set button 36 on the rim of the bucket will strike one of the three switches, 89-F, 89-A, or 89-EG, depending on the position in which the cam button 36 has been placed. If the cam button strikes switch 89-F, all of the scale relays 90-F which have been selected for the flint formulation will be energized, which will in turn energize the feeder solenoids 91-F which start the feeders, feeding the ingredients from the storage bins to the weigh hoppers. As the turntable comes into position No. II, it engages switch 92, which is normally closed, opening the same and breaking the circuit to the relay line 88, which in turn de-energizes the line to the motor starter solenoid 83, stopping the turntable 27. The mechanism utilized to operate switch 92 is the same as that used to operate switch 46 shown in Figure 5. The switch 46 shown in Figure 5 is located at position No. I and the switch 92 is of exactly the same type as 46 and is located at position No. II. As each scale reaches balance position, it strikes the switches 93-A and 93-B so on down the line for the thirteen scales, or the number of scales selected, closing the full beam switch for each scale when it has weighed out the specific amount of material called for in the formulation. The pilot lights 90' light up on the scales selected. The switches 93-A to 93-M are connected in series so that the closing of the last switch in the series will energize relay 94, closing the same, which in turn energizes relay 95, which upon closing energizes the motor starter solenoid 83 and moves the turntable to position No. III.

Of course, in order to close the circuit to relay 95, it is necessary that all the switches between relay 94 and relay 95 be closed. Switch 96-A is normally closed when the surge bin 65 is empty. Switch 97 is the tube selector by-pass switch and is manually closed for the first bucket only. Switch 46-C is normally closed and is open when a bucket is in position No. I. Inasmuch as there is no bucket in position No. I when a bucket is in position No. II, switch 46-C will be closed. With switches 96-A, 97, and 46-C closed and relay 94 closed, the circuit is closed to relay 95.

As the bucket comes into position No. III, the roller 53 on the turntable strikes switch 60, closing the circuit to relay 100. The closing of relay 100 energizes solenoid 101, which operates scale discharge feeders 25, discharging the weighed out materials from the weigh hoppers onto the conveyor belt 26. When each scale has discharged its raw material onto the conveyor, the scale beam is returned to its empty balance position. In this position the balance beam 126 no longer engages switch 93 so that the normally open contact 93 is open and the normally closed contacts 102 and 102' are closed. The distinguishing ingredients which have been dumped from the bucket as it enters position No. III pass down through the chute 30' by gravity. In passing through the chute, the distinguishing ingredients operate a flutter valve which actuates switch 103. Switch 103 is normally open but is closed by the contents of the bucket engaging the flutter valve as it passes through the chute 30'. The closing of switch 103 energizes relay 104, since relay 100 is closed.

At the same time the first bucket moves into position No. III, the second bucket has arrived at position No. I, where it opens the normally closed switch 46-C, breaking the circuit through relay 95, the opening of which de-energizes the motor starter solenoid 83. The closing of the turntable dump switch 103 completes the circuit through relay 104, energizing the same, and as soon as the weigh hoppers are empty, the switches 102-A to M close, closing the circuit through the contact on relay 104 to the one contact on relay 105, which is the mixer tilt timer relay. The tilting of the mixer 66 closes switch 106, closing the circuit to the mixer tilt timer relay 105, and after the mixer has been tilted a sufficient period of time to empty the contents thereof, the relay 105 closes, completing the circuit to relay 107 upon the energization of which the circuit is completed to time delay relay 86. When relay 86 times out it closes, energizing relay 87, closing the same. Inasmuch as relay 107 is closed, the closing of relay 87 energizes relay 88. There is no bucket in position No. II, so switch 92 is closed. The energization of relay 88 closes the same and energizes the motor starter solenoid 83, starting the motor 28 and moving the turntable to the next position.

As the turntable moves the first bucket into position No. IV, the second bucket moves into position No. II, contacting switch 92, opening the same, de-energizing relay 88, opening the same, which de-energizes motor starter solenoid 83, stopping the turntable. However, the first bucket has moved into position No. IV, where the cam button 38 strikes one of five selector switches—108-A, 108-B, 108-C, 108-D, and 108-E—which selects the tube 68 in which the batch is to be stored.

Assuming for purposes of illustration that the cam has been set to contact selector switch 108-C, this will close the circuit to the selector chute motor solenoid 109, causing the motor to rotate the chute 67 until the chute strikes the switch on the storage tube connected to switch 108-C. This will be the switch 110-C. The switch 110-C normally closes the circuit to the chute motor starter solenoid 109, but when the same is contacted by the chute, the circuit to the motor starter solenoid is broken, thus stopping the same, and the circuit to relay 111, which is a time delay relay, is closed. When the chute stays in position over the selected tube, relay 111 will close, which closes the circuit between relay 94 and relay 95, inasmuch as the surge bin 65 is empty and switch 96-A is closed, and switch 46-C is closed because no bucket is in position No. I. In the meantime, the second bucket in position No. II has caused the selector scales to weigh up the ingredients for the second batch, upon the completion of which the switches 93-A to 93-M for the scales selected will close, energizing relay 94, upon the closing of which the circuit to relay 95 is completed through switches 96-A, 46-C, and the contact on relay 111. The closing of relay 95 energizes motor starter solenoid 83, starting the turntable motor 28.

At this point, the first batch, which includes the distinguishing ingredients placed in the first bucket, is in the surge bin 65, and the second batch to be controlled by the second bucket is in the weigh hoppers ready to be fed to the conveyor belt 26. The mixer tilt timer 105, having timed out, will actuate the hydraulic cylinder 130 through solenoid 122 and return the mixer 66 to its horizontal position, closing switch 112, energizing the mixer horizontal relay 113. Since the surge bin is full, surge bin full switch 114 is closed. With the switch 114 closed, relay 113 closed and the surge bin gate open switch 116 being normally closed because the surge bin 65 is full and the gate is closed, the gate opening motor solenoid 117 is energized, causing the surge bin gate 125 to open. When the gate 125 is in its fully open position, it opens the gate open switch 116 and closes gate close switch 118. The closing of gate close switch 118 energizes the gate close relay 119. The surge bin 65 being empty, the surge bin empty switch 96-B is closed, closing the circuit through to the gate close relay contact to the gate closing motor solenoid 120. This closes the gate on the surge bin 65. Upon closing, the gate 125 contacts the gate close switch 118, opening the same and breaking the circuit to the gate close relay 119. At this point, the surge bin 65 is empty and the batch which was controlled by the first bucket has been dumped into the mixer 66, which is in horizontal position.

De-energization of the gate close relay 119 opens the contacts thereon and closes the circuit to the mixer timer relay 121, which determines the duration of the period during which the ingredients are mixed in the mixer 66. When the mixing time has expired, the time delay relay 121 closes. At this time, bucket No. 2 has moved into position No. III, closing switch 60 and energizing relay 100, which closes the circuit to the contact on mixer timer relay 121. The closing of the mixer timer relay 121 energizes the mixer tilt motor solenoid 122, which actuates the hydraulic cylinder 130 to tilt the mixer to its discharge position. Tilting of the mixer closes mixer tilt switch 106, which starts the mixer tilt timer 105. While the mixer tilt timer 105 is timing out, the mixer is discharging the mixed batch into the chute 67, which directs the batch into the storage tube selected by the cam 38 when the first bucket was in position No. IV. Upon timing out of the mixer tilt timer 105, the contacts thereof close and the mixer horizontal motor solenoid 123 is energized, which moves the mixer back to its horizontal position, opening switch 106 and closing switch 112. At the same time that the mixer tilt timer relay 105 closes, it completes the circuit through to relay 107 explained earlier, thereby energizing motor starter solenoid 83, moving the turntable to the next station.

At this point, the first batch is in the selected tube, which in this case was tube C, controlled by switch 108-C. The second batch, controlled by bucket No. 2, is ready to be dumped in the surge bin 65; and the third batch, controlled by bucket No. 3, is coming into position No. II, where the ingredients will be weighed for the same.

In order to more clearly show the sequence of operations which occur during the latter portion of a cycle and particularly during the overlap of the first and second cycles, the following description is given.

Assuming that the first bucket is in position No. IV and the second bucket is in position No. II, the mixer 66 is in its horizontal position as shown in Figure 1. With the mixer in this position, the mixer horizontal switch 112 is closed, energizing the relay 113. Inasmuch as the batch of ingredients containing the distinguishing ingredients from the first bucket is in the surge bin 65, the surge bin full switch 114 is closed, and inasmuch as the gate on the surge bin is closed, the gate open switch 116 will be in its normally closed position as shown in Figure 10. This completes the circuit to the surge bin gate motor solenoid 117, which starts the motor 124, which opens the surge bin gate 125 and allows the batch to fall from the surge bin into the mixer.

When the gate 125 is completely open, it strikes switch 118, which completes the circuit to relay 119. When switch 118 is closed, switch 116 opens, breaking the circuit to solenoid 117, stopping the motor. Relay 119 is energized but is a time delay relay and does not close until the bin has been open a sufficient amount of time to allow all the contents thereof to enter the mixer. At the expiration of this time cycle, the relay 119 closes, and inasmuch as the surge bin is now empty, the surge bin empty switch 96-B is closed and the circuit is completed to solenoid 120, which controls the motor 124 and closes the gate 125. When the gate 125 is closed, it closes switch 116 and opens switch 118, which de-energizes relay 119. At this point, switch 112 is still closed, inasmuch as the mixer is in horizontal position; however, even though switch 116 is closed, the solenoid 117 will not be energized due to the fact that the surge bin is empty and switch 114 is therefore open.

The closing of the gate 125 on the surge bin 65 de-energizes relay 119, opening the same. When this relay is open, it closes the circuit to the mixer timer 121, which starts its timing cycle to time the amount of mixing which the batch receives.

While the surge bin opening and closing is taking place, the second bucket is in position No. II, at which place the ingredients for the batch are being weighed up in the weigh hoppers. When this operation is complete and the switches 93-A to 93-M are closed, the relay 94 is energized; however, the circuit to the turntable motor 28 is not complete until the surge bin is empty, which closes surge bin empty switch 96-A. Also, the circuit will not be completed until the proper storage tube 68 for the batch containing the distinguishing ingredients of bucket No. 1 is selected and relay 111 is energized. These three completed operations; namely, the closing of the series of scale balance switches 93-A to 93-M, the closing of surge bin empty switch 96-A, and the selection of the storage tube, are necessary to complete the circuit to the motor starter solenoid 83 to start the turntable motor 28 to move bucket No. 2 from position No. II to position No. III. It will be understood, of course, that the opening, emptying, and closing of the surge bin 65 occur immediately after the second bucket arrives at station No. II, and the mixer will start its mixing cycle some time before the balance beam switches are closed to move bucket No. 2 from position No. II to position No. III so that part of the mixing cycle is completed before bucket No. 2 arrives at position No. III.

At position No. III, the distinguishing ingredients from bucket No. 2 are dumped and the weigh hoppers discharge the ingredients for the second batch onto the conveyor belt 26, which delivers the batch to the elevator 64 for delivery to the surge bin 65. However, before the second batch is delivered to the surge bin 65, the mixer timer relay 121 will complete its cycle, closing the same and completing the circuit through relay 100, which is closed by reason of bucket No. 2 being in position No. III, to the mixer tilt motor solenoid 122, which tilts the mixer preparatory to dumping the first batch into the selected storage tube 68. When the mixer tilts, switch 112 opens and switch 106 is closed, the closing of switch 106 completes the circuit to time delay relay 105, which is timed to give the mixer 66 sufficient time to dump its contents into the storage tube 68. At the expiration of the cycle, the time delay relay 105 closes, energizing mixer horizontal solenoid 123, which returns the mixer to its horizontal position. At the same time that time delay relay 105 closes, it completes the circuit through relay 100, through the scale empty switch 102, through the closed relay 104 to relay 107, which upon closing energizes relay 86, which in turn energizes relay 88, which upon closing energizes the motor solenoid 83, to move the turntable 27, bringing bucket No. 2 to position No. IV.

While the mixer is dumping the first batch into the storage tube 68, the bucket elevator will deliver the second batch to the surge bin 65 on which the gate 125 is closed; however, since the mixer is not in its horizontal position while this operation is performed, switch 112 will be open and, therefore, relay 113 will not be energized and the surge bin gate 125 will not open until the mixer 66 has been returned to its horizontal position. When the mixer returns to its horizontal position, the batch containing the distinguishing ingredients of bucket No. 2 is in the surge bin 65 and bucket No. 2 is in position No. IV so that the entire cycle of opening and closing of the surge bin 65, and operation of the mixer 66 will be repeated.

With the control set-up illustrated and described herein, it is possible to accurately control the quantity of each ingredient entering into a prepared batch of raw material to insure that the proper proportion of raw materials will be present in all batches and that the batches will keep their homogeneous nature as nearly as possible until they are delivered to the melting furnace. Also, it will be seen that accurate controls have been set up whereby a plurality of batches are in process at one time and may be kept properly segregated from one another so that there is no danger of two batches intermingling at any point on the equipment.

The system has been described showing thirteen scales having three beams each to select raw materials to be placed in five storage tubes. It will be understood, of course, that the system has sufficient flexibility that it can be utilized with any number of scales, each scale having any number of beams, and also the raw materials can be supplied to any number of storage tubes found necessary for carrying out the particular operation to which the invention is to be adapted.

I claim:

1. In a device for preparing a series of individual batches of raw material in which the consecutive batches are not necessarily of the same formulation and in which the device will measure the proper amount of ingredients for a given formulation and will deliver the measured batch to the proper storage tube for that particular formulation, comprising a rotatable turntable; a plurality of tiltable buckets to contain certain essential ingredients which distinguish one batch from another, said buckets being positioned in openings in said turntable and carried thereby; a manually set cam positioned on the turntable adjacent said bucket and movable therewith to determine the other ingredients to be added to the formulation; a plurality of scales; a weigh hopper on each of said scales; a plurality of scale beams on each scale, the number of beams on each scale corresponding to the number of settings possible for the manually set cam adjacent the bucket; a series of switches positioned across the path of travel of said cam, the arrangement of switches being such that a switch is positioned above each of the possible settings for the cam; an electric circuit closed by said cam contacting said switch for selecting the proper beam on each of the plurality of scales to weigh a predetermined amount of each ingredient for the batch; a controlled feeder to supply the material to the weigh hoppers in the amount determined by the setting of the scale beam; a second manually set cam adjacent the bucket; a plurality of storage tubes for storing the batch; a chute for directing the material into the tubes, the number of storage tubes corresponding to the number of positions for said second manually set cam adjacent the bucket; a series of switches positioned across the path of travel of said second cam, the arrangement of switches being such that a switch is positioned above each of the possible settings for the cam; an electric circuit closed by said second cam for directing the chute to the storage tube selected by said second cam; a mixer positioned between the scales and the storage tubes; a surge bin positioned between the scales and the mixer for storing one batch while the mixer is mixing the preceding batch, said mixer being tiltable from a horizontal position to receive the material from the surge bin to an inclined position to deposit the material in the chute; a gate on said surge bin to control the flow of prepared batch material to the mixer; control means to prevent the opening of said gate on the surge bin until the mixer is in horizontal position; control means to prevent the mixer from discharging the mixed batch to the storage tube until the proper tube has been selected; means for imparting rotary motion to the turntable; a conveyor system for transferring the material from the weigh hoppers to the surge bin; means for discharging the measured contents of said weigh hoppers onto the conveyor system; and a chute for directing the contents of the bucket onto the conveyor system with the material discharged from the weigh hoppers.

2. In a device for preparing a series of individual batches of raw material in which the consecutive batches are not necessarily of the same formulation and in which the device will measure the proper amount of ingredients for a given formulation and will deliver the measured batch to the proper storage tube for that particular formulation, comprising a rotatable turntable; a plurality of tiltable buckets to contain essential ingredients which distinguish one batch from another, said buckets being positioned in openings in said turntable and carried thereby, said buckets passing through four stations during their path of travel with the rotating turntable; means to halt each bucket at each station; control means to hold said bucket at each of said stations until the operations to be performed while the bucket is at that station have been completed; a manually set cam positioned on the turntable adjacent said bucket and movable therewith to determine the other ingredients to be added to the formulation; a plurality of scales; a weigh hopper on each of said scales; a plurality of scale beams on each scale, the number of beams on each scale corresponding to the number of settings possible for the manually set cam adjacent the bucket; a series of switches positioned across the path of travel of said cam, the arrangement of switches being such that a switch is positioned above each of the possible settings for the cam; an electric circuit closed by said cam contacting said switch for selecting the proper beam on each of the plurality of scales to weigh a predetermined amount of each ingredient for the batch; a controlled feeder to supply the material to the weigh hoppers in the amount determined by the setting of the scale beam; a second manually set cam adjacent the bucket; a plurality of storage tubes for storing the batch; a chute for directing the material into the tubes, the number of storage tubes corresponding to the number of positions for said second manually set cam adjacent the bucket; a series of switches positioned across the path of travel of said second cam, the arrangement of switches being such that a switch is positioned above each of the possible settings for the cam; an electric circuit closed by said second cam for directing the chute to the storage tube selected by said second cam; a mixer positioned between the scales and the storage tubes; a surge bin positioned between the scales and the mixer for storing one batch while the mixer is mixing the preceding batch, said mixer being tiltable from a horizontal position to receive the material from the surge bin to an inclined position to deposit the material in the chute; a gate on said surge bin to control the flow of prepared batch material to the mixer; control means to prevent the opening of said gate on the surge bin until the mixer is in horizontal position; control means to prevent the mixer from discharging the mixed batch to the storage tube until the proper tube has been selected; means for imparting rotary motion to the turntable; a conveyor system for transferring the material from the weigh hoppers to the surge bin; means for discharging the measured contents of said weigh hoppers onto the conveyor system; and a chute for directing the contents of the bucket onto the conveyor system with the material discharged from the weigh hoppers.

3. In a device for preparing a series of individual batches of raw materials in which the consecutive batches are not necessarily of the same formulation and in which the device will measure the proper amount of ingredients for a given formulation and will deliver the measured batch to the proper storage tube for that particular formulation, comprising a rotatable turntable; a plurality of tiltable buckets to contain certain essential ingredients which distinguish one batch from another, said buckets being positioned in openings in said turntable and carried thereby; a manually set cam positioned on the turntable adjacent said bucket and movable therewith to determine the other ingredients to be added to the formulation; a plurality of scales; a weigh hopper on each of said scales; a plurality of scale beams on each scale, the number of beams on each scale corresponding to the number of settings possible for the manually set cam adjacent the bucket; a series of switches positioned across the path of travel of said cam, the arrangement of switches being such that a switch is positioned above each of the possible settings for the cam; an electric circuit closed by said cam contacting said switch for selecting the proper beam on each of the plurality of scales to weigh a predetermined amount of each ingredient for the batch; a controlled feeder to supply the material to the weigh hoppers in the amount determined by the setting of the scale beam; a second manually set cam adjacent the bucket; a plurality of storage tubes for storing the batch; a chute for directing the material into the tubes, the number of storage tubes corresponding to the number of positions for said manually set cam adjacent the bucket; a series of switches positioned across the path of travel of said second cam, the arrangement of switches being such that a switch is positioned above each of the possible settings for the cam; an electric circuit closed by said second cam for directing the chute to the storage tube selected by said second cam; a mixer positioned between the scales and the storage tubes; an electric circuit for operating said mixer; a surge bin positioned between the scales and the mixer for storing one batch while the mixer is mixing the preceding batch, said mixer being tiltable from a horizontal position to receive the material from the surge bin to an inclined position to deposit the material in the chute; a gate on said surge bin to control the flow of prepared batch material to the mixer; control means to prevent the opening of said gate on the surge bin until the mixer is in a horizontal position; control means to prevent the mixer from discharging the mixed batch to the storage tube until the proper tube has been selected; means for imparting rotary motion to the turntable; a conveyor system for transferring the material from the weigh hopper to the surge bin; means for operating said conveyor system; an electric circuit for energizing the means for operating said conveyor system; means for discharging the measured contents of said weigh hoppers onto the conveyor system; and a chute for directing the contents of the bucket onto the conveyor system with the material discharged from the weigh hoppers, the arrangement of said electric circuit for the conveyor system and said electric circuit for the mixer being such that when the circuit to the mixer is broken the circuit to the conveyor system is also broken.

4. In a device for preparing a series of individual batches of raw materials in which the consecutive batches are not necessarily of the same formulation and in which the device will measure the proper amount of ingredients for a given formulation and will deliver the measured batch to the proper storage tube for that particular formulation, comprising a rotatable turntable; a tiltable bucket to contain certain essential ingredients which distinguish one batch from another, said bucket being positioned in said turntable and carried thereby; a manually set cam positioned on the turntable adjacent said bucket and movable therewith to determine the other ingredients to be added to the formulation; a plurality of scales; a weigh hopper on each of said scales; a plurality of scale beams on each scale, the number of beams on each scale corresponding to the number of settings possible for the manually set cam adjacent the bucket; a series of switches positioned across the path of travel of said cam, the arrangement of switches being such that a switch is positioned above each of the possible settings for the cam; an electric circuit closed by said cam contacting said switch for selecting the proper beam on each of the plurality of scales to weigh a predetermined amount of each ingredient for the batch; a controlled feeder to supply the material to the weigh hoppers in the amount determined by the setting of the scale beam, a second manually set cam adjacent the bucket; a plurality of storage tubes for storing the batch; a chute for directing the material into the tubes, the number of storage tubes corresponding to the number of positions for said second manually set cam adjacent the bucket; a series of switches positioned across the path of travel of said second cam, the arrangement of switches being such that a switch is positioned above each of the possible settings for the cam; an electric circuit closed by said second cam for directing the chute to the storage tube selected by said second cam; a mixer positioned between the scales and the storage tubes; a surge bin positioned between the scales and the mixer for storing one batch while the mixer is mixing the preceding batch, said mixer being tiltable from a horizontal position to receive the material from the surge bin to an inclined position to deposit the material in the chute; a gate on said surge bin to control the flow of prepared batch material to the mixer; control means to prevent the opening of said gate on the surge bin until the mixer is in horizontal position; control means to prevent the mixer from discharging the mixed batch to the storage tube until the proper tube has been selected; means for imparting rotary motion to the turntable; a conveyor system for transferring the material from the weigh hoppers to the surge bin; means for discharging the measured contents of said weigh hoppers onto the conveyor system; and a chute for directing the contents of the bucket onto the conveyor system with the material discharged from the weigh hoppers.

References Cited in the file of this patent

UNITED STATES PATENTS

| | | |
|---|---|---|
| 1,867,489 | Bennett et al. | July 12, 1932 |
| 2,105,266 | Rendall | Jan. 11, 1938 |